United States Patent [19]

Morita et al.

[11] Patent Number: 5,395,580
[45] Date of Patent: Mar. 7, 1995

[54] METHOD FOR FABRICATING AUTOMOTIVE INTERIOR COMPONENTS

[75] Inventors: Hirokiyo Morita; Sadao Morishita, both of Atsugi, Japan

[73] Assignee: Kasai Kogyo Co., Tokyo, Japan

[21] Appl. No.: 112,303

[22] Filed: Aug. 27, 1993

Related U.S. Application Data

[63] Continuation of Ser. No. 669,727, Mar. 14, 1991, abandoned.

[30] Foreign Application Priority Data

Mar. 14, 1990 [JP] Japan .................................. 2-63521

[51] Int. Cl.$^6$ .............................................. B29C 43/22
[52] U.S. Cl. ................................. 264/266; 428/319.9
[58] Field of Search ............... 428/319.9; 264/259, 264/266, 319, 320, 330, 331.11, DIG. 57

[56] References Cited

U.S. PATENT DOCUMENTS

| | | |
|---|---|---|
| 3,922,429 | 11/1975 | Welch et al. . |
| 4,247,586 | 1/1981 | Rochlin . |
| 4,572,856 | 2/1986 | Gembinski . |
| 4,873,041 | 10/1989 | Masui et al. ........................ 264/135 |
| 4,891,085 | 1/1990 | Mulligan ............................ 156/216 |
| 4,997,707 | 3/1991 | Otawa et al. ...................... 428/319.3 |
| 5,089,328 | 2/1992 | Doerer et al. ..................... 428/308.4 |

FOREIGN PATENT DOCUMENTS

0184768A2 12/1985 European Pat. Off. .
0214747A3 7/1986 European Pat. Off. .
0429020A2 11/1990 European Pat. Off. .

*Primary Examiner*—George F. Lesmes
*Assistant Examiner*—Christopher W. Raimund
*Attorney, Agent, or Firm*—Dickstein, Shapiro & Morin

[57] ABSTRACT

A method for fabricating an automotive interior component. The automotive interior component consists of a laminated structure comprising a resin core member having a certain rigidity, a high density polyurethane foam layer, and a soft surface skin member. Since the high density polyurethane foam is bonded over the reverse surface of the surface skin member which is typically lined by a soft foam layer for giving a soft feel, it is possible to bond the surface skin member over the resin core member at the same time as mold press forming the resin core member from semi molten resin owing to the heat insulation and barrier capabilities of the high density polyurethane foam layer. Since the conduction of heat from the semi molten resin to the soft foam layer of the surface skin member is avoided, and the press pressure is mitigated so that the collapsing of the foam layer during the press molding process is prevented. The present invention further offers the advantage of simplifying the fabrication process by thus accomplishing the bonding of the surface skin member over the resin core member and the mold press forming of the resin core member at the same time as a single step.

1 Claim, 6 Drawing Sheets

METHOD FOR FABRICATING AUTOMOTIVE INTERIOR COMPONENTS

This application is a continuation of application Ser. No. 07/669,727, filed Mar. 14, 1991, now abandoned.

TECHNICAL FIELD

The present invention relates to automotive interior components such as automotive door trims, and in particular to automotive components which integrally combine a surface skin member giving a soft feel, and a resin core member having the necessary rigidity to give the component the capability to retain its shape. The present invention also relates to a method for fabricating such automotive components.

BACKGROUND OF THE INVENTION

As a conventional and typical structure for automotive door trims, rear corner trims and other interior components that are mounted on the interior of a vehicle body panel, there is known the laminated structure comprising a resin core member 1 formed into a desired curved shape, and a surface skin member 2 bonded over the surface of the resin core member 1 as illustrated in FIG. 5.

Due to the recent demand for the resin core members 1 to have complicated three dimensional shapes, they are commonly fabricated by the mold press forming according to which resin material in semi molten state is fed into a metallic mold set or a die set for mold press forming to be shaped into complicated three dimensional shapes. In such a case, to the end of simplifying the overall fabrication process, it has been proposed to press bond the surface skin member 2 onto the resin core member 1 at the same time as mold press forming the resin core member 1.

Now, such a process of mold press forming the surface skin member 2 and press bonding the resin core member 1 thereto is briefly described in the following with reference to FIG. 6 and 7. First of all, a predetermined amount of a resin material in semi molten state is fed onto a lower mold 3 for mold press forming from a gate 3a as illustrated in FIG. 6. A surface skin member 2 is positioned above the lower mold 3 by a clamping device 5 retaining the peripheral part of the surface skin member 2, and an upper mold 6 for mold press forming is placed thereabove in a vertically moveable manner by means of a lifting device not shown in the drawings.

In this case, the surface skin member 2 comprises a resin sheet 2a such as a PVC sheet and a high expansion ratio foamed backing layer 2b consisting of polyolefin resin foam so as to give a soft feel to this surface skin member 2. The expansion ratio of foam material is given as the ratio of the actual density of the resin to the apparent density of the foamed resin.

Thereafter, by engaging and closing the upper and lower molds 3 and 6 for mold press forming with each other, the semi molten resin material 4 is formed into the resin core member 1 and, at the same time, the resin core member 1 and the surface skin member 2 are integrally joined with each other.

However, due to the melting heat (200° C.) for the resin material 4 and the mold press pressure (50 to 80 kg/cm$^2$) existing during the process of mold press forming illustrated in FIG. 7, collapsing of the foam layer 2b tends to occur, and the resulting surface irregularities of the surface skin member 2 produces an unattractive appearance as illustrated in FIG. 8.

Also, the collapsing of the foam layer 2b causes a fluctuation in the thickness of the foam layer 2b, and the surface texture becomes unattractive due the loss of the soft feel at such thinned portions.

To correct this situation, it is conceivable to use a low expansion ratio material, a foaming material having mutually separated cells, or a high density foaming material for the foam layer 2b, to increase the thickness of the foam layer 2b, or to use a more heat resistant resin. However, in either case, because the material cost is increased, and/or the weight is increased in spite of a general desire to reduce weight, such counter measures have not been acceptable.

Thus, in order to bond a surface skin member 2 having a soft feel over a resin core member I having a desired rigidity, it is necessary to bond the surface skin member 2 onto the resin core member 1 by vacuum forming or the like following the mold press forming of the resin core member 1 as a separate process, and this not only requires large scale production facilities but also causes a substantial cost increase.

BRIEF SUMMARY OF THE INVENTION

In view of such problems of the prior art, a primary object of the present invention is to provide automotive interior components comprising a surface skin layer having attractive appearance and feel, and a rigid core member which can be fabricated in an efficient manner.

A second object of the present invention is to provide such automotive interior components which have highly attractive appearance and feel.

A third object of the present invention is to provide such automotive interior components which are economical to manufacture.

A fourth object of the present invention is to provide a method for fabricating such automotive interior components.

These and other objects of the present invention can be accomplished by providing an automotive interior component, comprising: a resin core member consisting of a synthetic resin member formed into a certain shape and having a certain rigidity; a foam layer made of high density polyurethane, preferably, having a density of 0.03 to 0.05 g/cm$^3$ and a thickness greater than 2 mm, bonded over a surface of the resin core member; and a surface skin member consisting of a soft sheet member and bonded over a surface of the foam layer.

Preferably, the surface skin member consists of a surface skin sheet and a soft foam layer bonded between the surface skin sheet and the high density polyurethane foam layer. It is also preferred that the surface skin sheet consists of a PVC sheet and the soft foam layer consists of a polyolefin foam.

Thus, according to the automotive interior component of the present invention, since the high density polyurethane foam is bonded over the reverse surface of the surface skin member giving a soft feel, for instance by being backed by a soft foam layer, owing to the heat insulation and barrier capabilities of the high density polyurethane foam layer, conduction of heat from the semi molten resin to the surface skin member is avoided, and the press pressure is mitigated so that the collapsing or other irregular deformation of the surface skin member is prevented.

Further, according to the present invention, since the surface skin member having a soft feel can be bonded on the resin core member at the same time as mold press forming the resin core member, it becomes possible to combine the processes of forming the core member and joining the core member with the surface skin member which is required for producing a soft feel into a single process.

The present invention also provides a method for fabricating an automotive interior component, comprising the steps of: feeding a predetermined amount of a resin material in a semi molten state onto a mold surface of a lower mold for mold press forming; positioning an assembly consisting of a surface skin member and a layer of high density polyurethane foam on the lower mold with a peripheral part of the assembly retained by a clamping device and the high density polyurethane foam layer facing the semi molten resin material; lowering an upper mold for mold press forming onto the assembly; and forming a resin core member from the semi molten resin material into a desired shape by engaging the upper and lower molds for mold press forming with each other; the resin core member being thereby integrally joined with the surface skin member to form a finished automotive interior component.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1A:
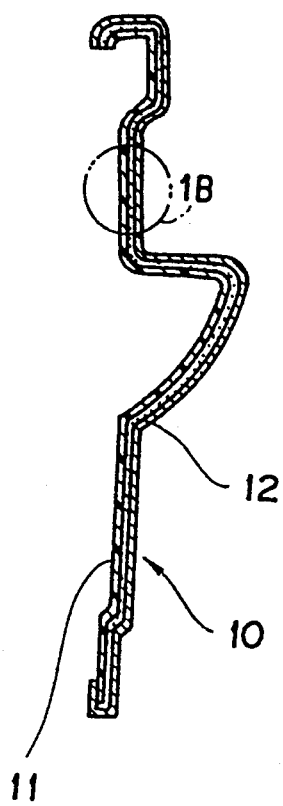
FIG. 1 is a vertical sectional view of the automotive interior component according to the present invention as applied to an automotive door trim.
Figure 1B:
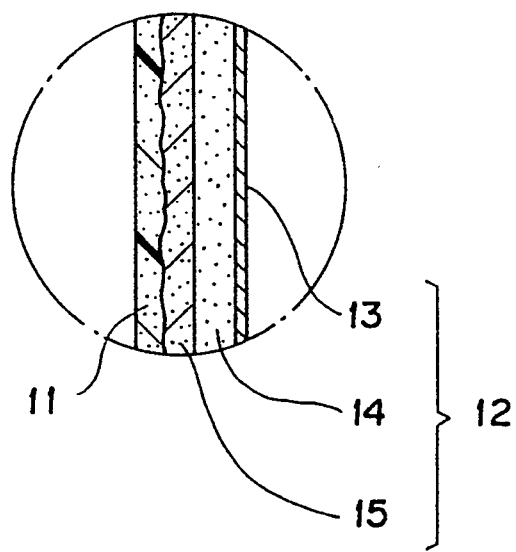
Figure 2:
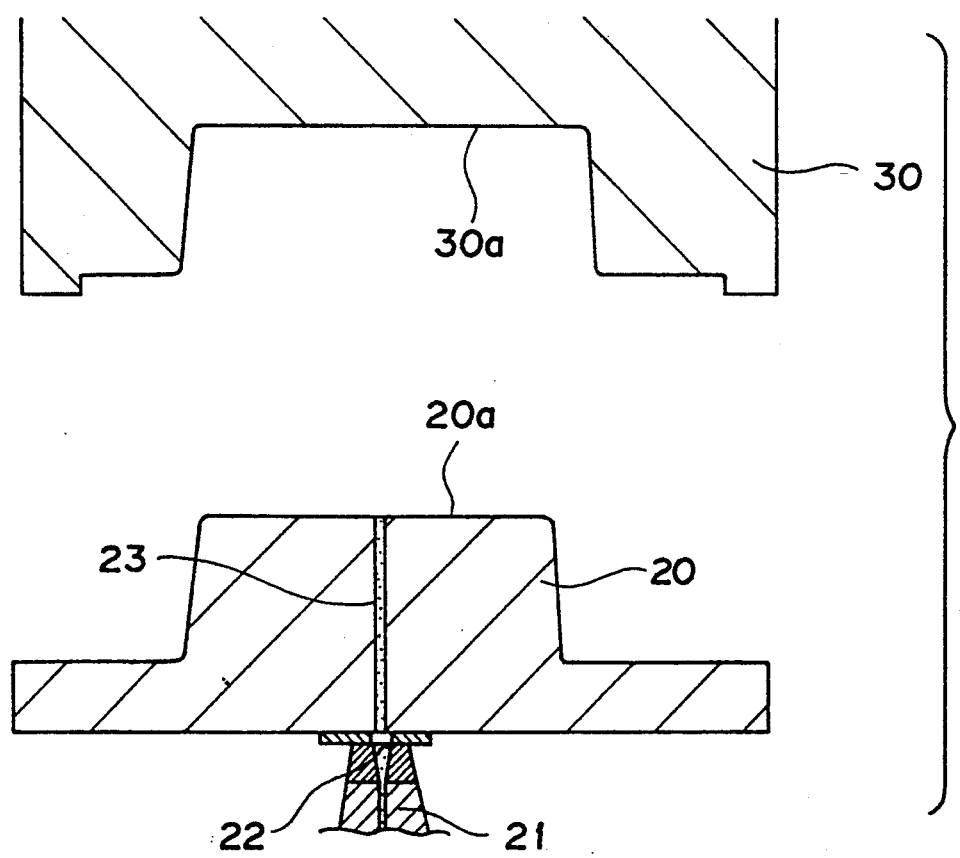
FIGS. 2 through 4 are sectional views showing different steps of the method of the present invention.

FIG. 1 shows an automotive door trim 10 given here as an example of the automotive interior component according to the present invention. In this drawing, the automotive door trim 10 generally consists of a resin core member 11 which is mold press formed into a desired shape, and a surface skin member 12 which is attached to the surface of the resin core member 11 when mold press forming this resin core member 11.

Further, this surface skin member 12 consists of a three-layered laminated body including, as seen from the surface of the finished product, a surface skin sheet 13, a soft foam layer 14 and a high density polyurethane foam layer 15. The surface skin sheet 13 may consist of a PVC or polyolefin resin sheet, and the soft foam layer 14 may consist of a high expansion ratio foam layer 14 for producing a soft feel. For instance, a polyolefin foam having an expansion ratio of 20, 25 or 30 may be used, or, alternatively, a PVC foam having a expansion ratio of 3 may also be used to produce a desired soft feel.

Preferably, the high density polyurethane foam 15 attached to the reverse surface of the soft foam layer 14 consists of a high density polyurethane slab or a compressed polyurethane sheet having a density of 0.03 to 0.05 g/cm$^3$ and a thickness of 2 mm or more.

Thus, according to this automotive door trim 10, since the resin core member 11 is mold press formed, it can be molded into a desired shape and offer much freedom in designing the shape of the product, and, in combining this surface skin member 12 with the resin core member 11 by mold press forming, since the irregularities of the resin core member 11 are mostly accommodated by the high density polyurethane foam 15 and the remaining small irregularities of the resin core member 11 are accommodated by the soft foam layer 14, in addition to the fact that the high density polyurethane foam 15 protects the soft foam layer 14 from the melting heat from the resin core member 11 and the press pressure so that the soft foam layer 14 may not sustain collapsing,.the product is free from surface irregularities and a favorable surface texture can be obtained.

Now, the method of the present invention is described in the following with reference to the appended drawings.

The metallic mold device for carrying out the method of the present invention comprises a lower mold 20 for mold press forming and an upper mold 30 for mold press forming which can be engaged with the lower mold 20 and can be moved vertically. The upper and lower molds 20 and 30 are provided with mold surfaces 20a and 30a which are provided with substantially identical curved contours.

In regard to this lower mold 20 for mold press forming, a nozzle 22 of an extruder 21 is connected to the lower mold 20 as a supply means for supplying the resin material in semi molten state, and a gate 23 communicating with this nozzle 22 is provided in the lower mold 20.

Figure 3A:
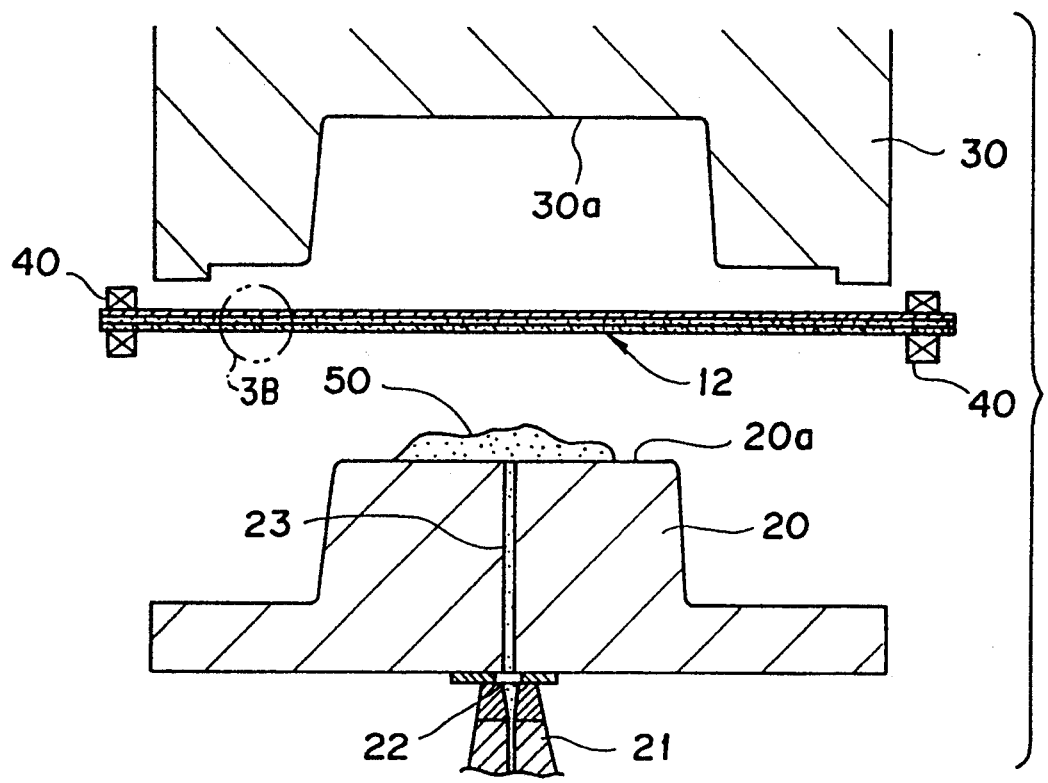
Figure 3B:
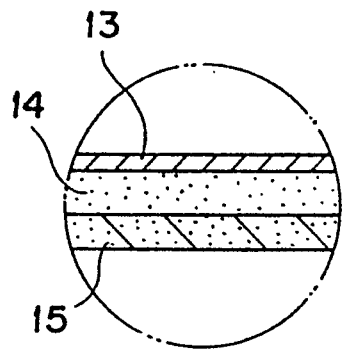

Then, the surface skin member 12 is positioned with its surface skin sheet 13 facing upwards by a clamping device 40 retaining its periphery (refer to FIG. 3).

Once the positioning of the surface skin member. 12 is all set up, the resin material 50 in semi molten state is filled into the gate 23 from the nozzle 22 of the extruder 21 as illustrated in FIG. 3, and a prescribed amount of this resin material 50 is distributed from this gate 23 onto the mold surface 20a of the lower mold 20.

Figure 4A:
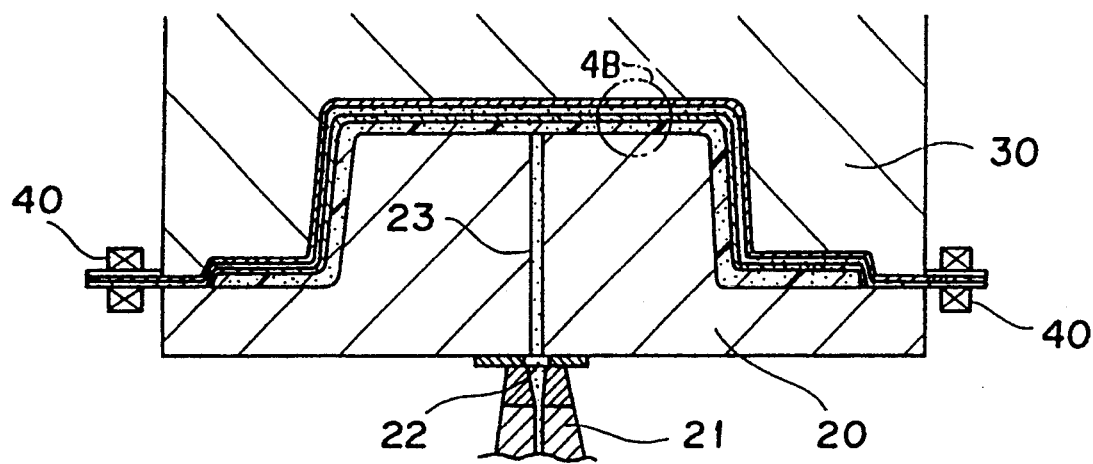
Figure 4B:
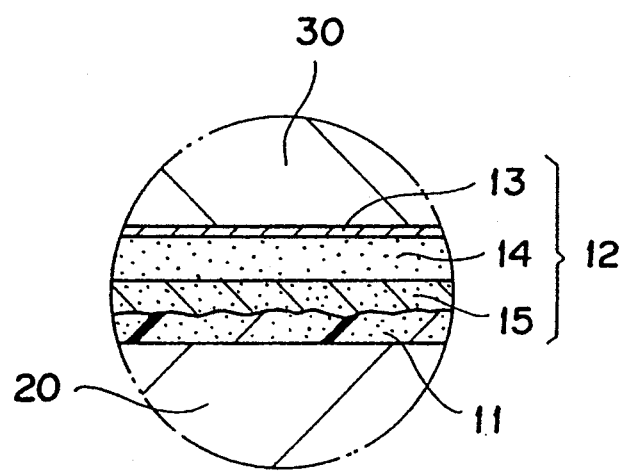
Figure 5:
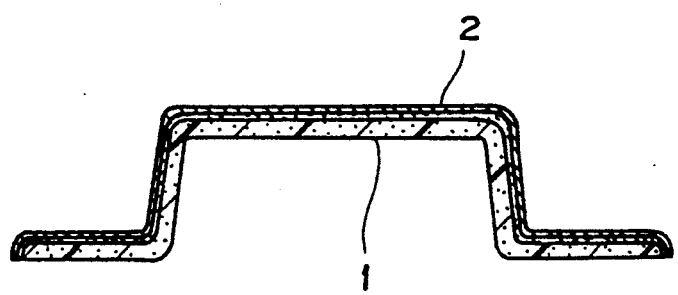
FIG. 5 is a sectional view of the finished automotive interior component.
Figure 6:
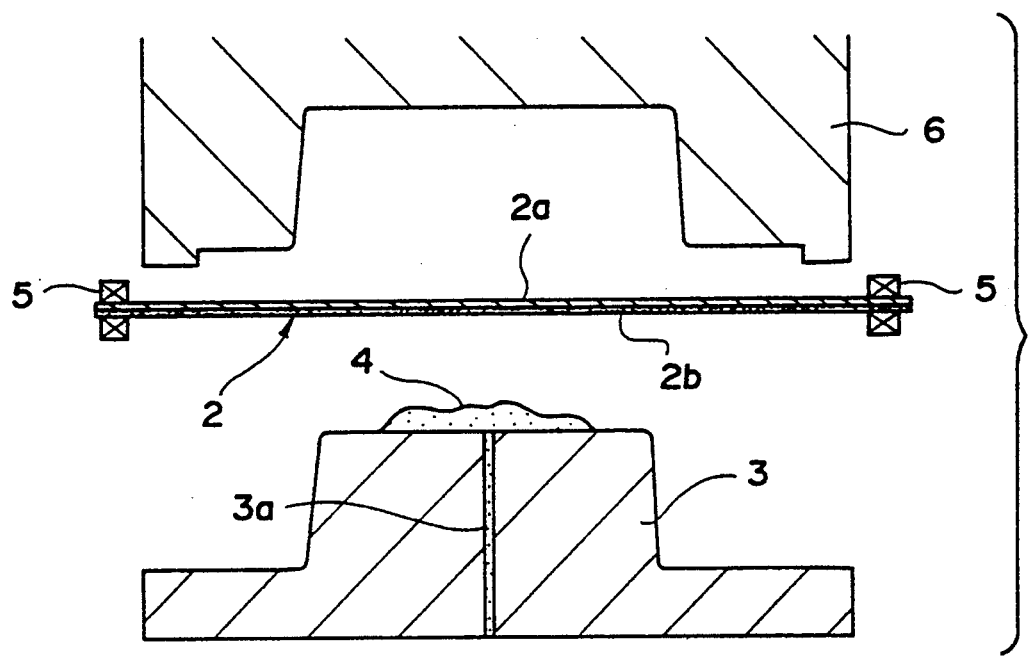
FIGS. 6 and 7 are sectional views showing different steps of the conventional method for fabricating an automotive interior component.
Figure 7:
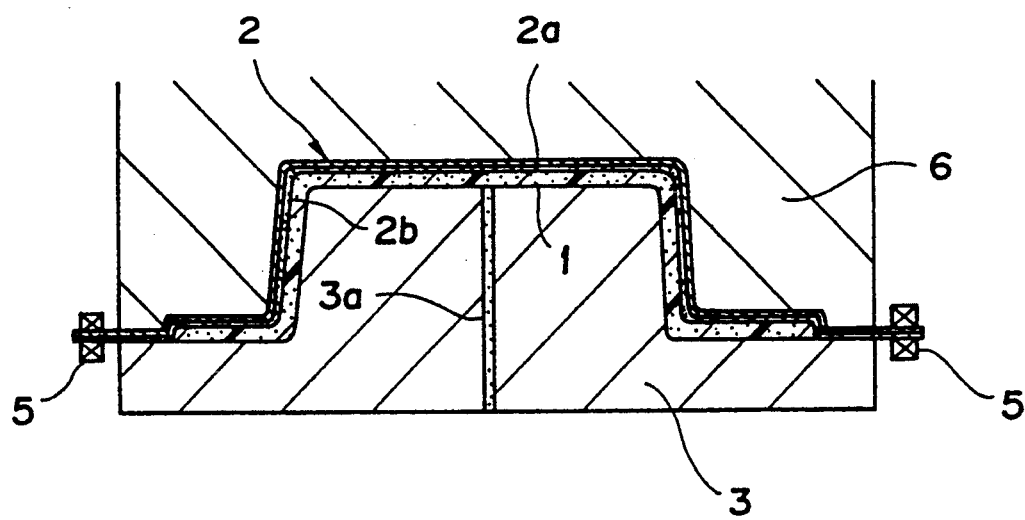
Figure 8:
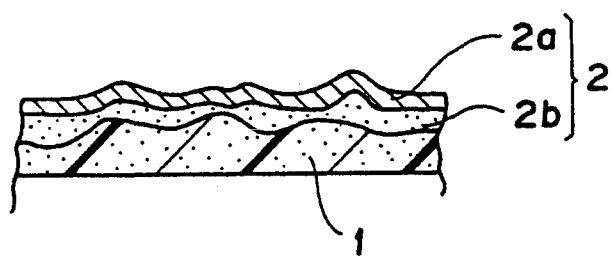
FIG. 8 is a fragmentary sectional view of a conventional automotive interior component illustrating the defects which could be produced in such a conventional automotive interior component.

Thereafter, as the upper mold 30 for mold press forming is lowered and the upper and lower molds 20 and 30 for mold press forming are engaged with each other as illustrated in FIG. 4, the resin material 50 is formed in the clearance between the upper and lower molds 20 and 30 so that the resin core member 11 is formed into a desired shape while the surface skin member 12 is integrally attached to the surface of the resin core member 11.

At this point, since the soft foam layer 14 is insulated from the heat of the resin material 50 by the high density polyurethane foam layer 15, and the mold press pressure is also mitigated by the high density polyurethane foam layer 15, no collapsing would occur in the soft foam layer 14.

When the upper and lower molds 20 and 30 for mold press forming are released from each other and the molded product is removed from the lower mold 30, the soft foam layer 14 regains its shape and offers a favorable cushioning capability. Since no collapsing takes place in the soft foam layer 14, no surface irregularities are present on the surface of the finished product, and the product is provided with a attractive appearance and a favorable feel.

Now, an embodiment of the method of the present invention as applied to the method of fabricating an automotive door trim is described in the following.

Embodiment 1

A surface skin member was positioned in an open mold set for mold press forming by retaining its periphery with a clamping device.

The surface skin member consisted of a laminated body of a PVC sheet having the thickness of 0.60 mm, a polypropylene foam layer having an expansion ratio of 25, and a high density polyurethane foam having the density of 0.05 g/cm$^3$ and the thickness of 2.5 mm.

The resin material supplied onto the mold surface of the mold set for mold press forming consisted of a mixture of 80 weight % of PP resin and 20 weight % of inorganic filler which was in semi molten state and was placed on several locations on the mold surface of the lower mold.

Then, the upper and lower molds for mold press forming were closed and engaged with each other. The press pressure was 70 kg/cm$^2$ and the press time was 35 seconds.

When the mold set was opened and the molded product was removed, it was observed that the molded product was free from surface irregularities and was provided with soft surface texture. The fabrication of an automotive door trim was completed when the surface skin member was folded over the reverse surface of the resin core member along its periphery and was bonded thereto.

Thus, according to the automotive interior component of the present invention, since the collapsing of the high expansion ratio foam layer is prevented by the high density polyurethane foam when the surface skin member carrying this foam layer is joined with the resin core member by mold press forming owing to the heat insulating capability of the high density polyurethane foam and its capability to serve as a barrier, the product can retain a favorable cushioning capability and can offer not only an attractive surface finish but also a favorable surface texture.

Further, since the method of the present invention consists of integrally joining the surface skin member which may include a high expansion ratio foam layer with the resin core member by mold press forming with the high density polyurethane foam laminated therebetween, it is possible to fabricate a product having a soft feel with a single process of mold press forming as opposed to the conventional method which required the two steps of forming the resin core member and joining the surface skin member having a soft feel thereto. Thus, the fabrication process is simplified and requires smaller production facilities so that a significant reduction in cost can be achieved.

Although the present invention has been described in terms of specific embodiments, it is possible to modify and alter details thereof without departing from the spirit of the present invention.

What we claim is:

1. A method for fabricating an automotive interior component, comprising the steps of:

positioning a surface skin member between a first mold part and a second mold part, said surface skin member having a PVC skin sheet facing the second mold part, a layer of high expansion ratio soft polyolefin foam adjacent the PVC skin sheet, and a layer of high density urethane foam having a density of 0.03 to 0.05 g/cm$^3$ and a thickness greater than 2 mm facing the first mold part and wherein said surface skin member has its peripheral part retained by a clamping device;

feeding a predetermined amount of a resin material in a semi-molten state onto a mold surface of the first mold part following said positioning step;

moving said mold parts together to initiate a mold press forming operation;

forming a resin core member into a desired shape by engaging the first and second mold parts for mold press forming with each other; and integrally joining the resin core member with the surface skin member during said forming step;

wherein the layer of high density urethane foam prevents the collapse of the layer of high expansion ratio soft foam during said forming step.

* * * * *